Figure 1:
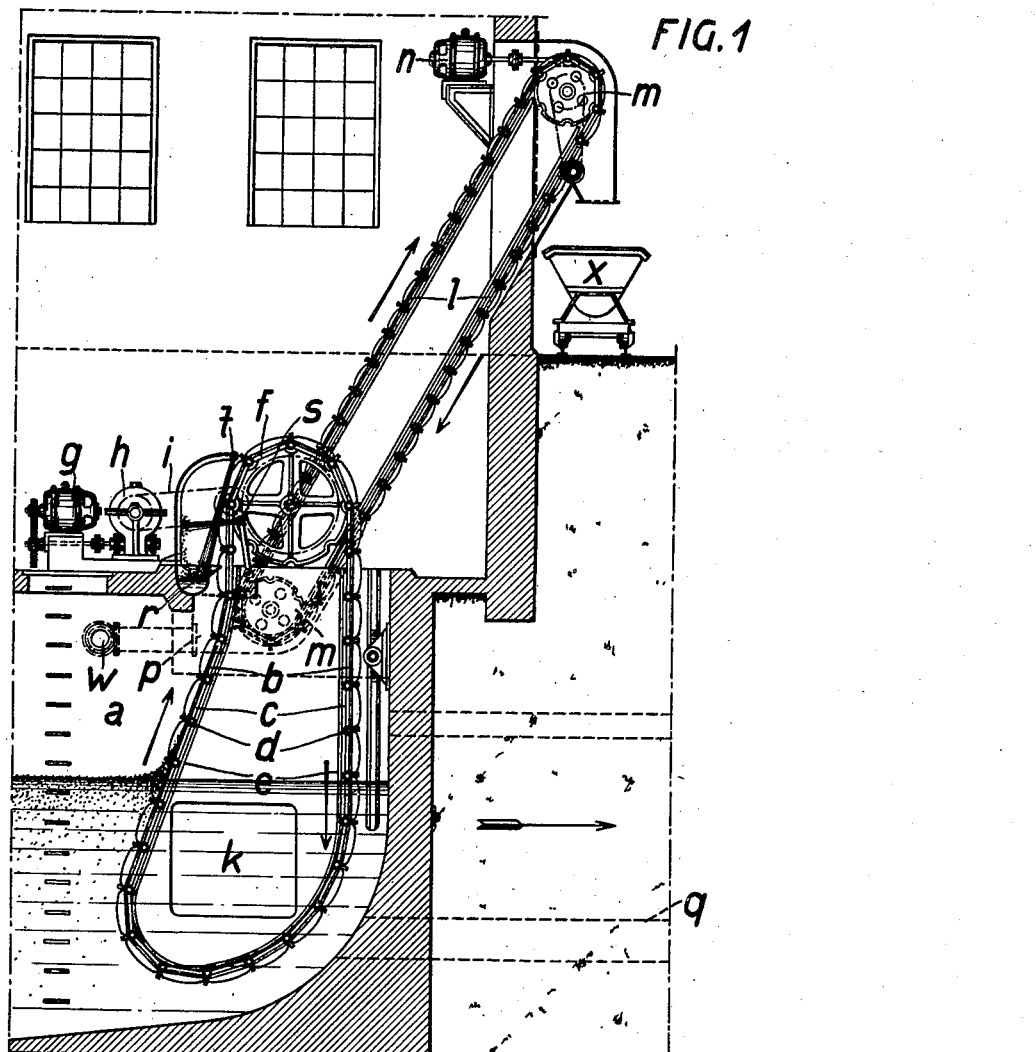

June 11, 1929. E. GEIGER 1,716,376
APPARATUS FOR THE MECHANICAL PURIFICATION OF WASTE WATER
Filed July 28, 1925 2 Sheets-Sheet 1

INVENTOR

June 11, 1929.　　　　　E. GEIGER　　　　1,716,376
APPARATUS FOR THE MECHANICAL PURIFICATION OF WASTE WATER
Filed July 28, 1925　　2 Sheets-Sheet 2

INVENTOR

Patented June 11, 1929.

1,716,376

UNITED STATES PATENT OFFICE.

EUGEN GEIGER, OF KARLSRUHE, BADEN, GERMANY.

APPARATUS FOR THE MECHANICAL PURIFICATION OF WASTE WATER.

Application filed July 28, 1925, Serial No. 46,653, and in Germany March 7, 1925.

In purifying town waste water (water discharged into sewers) by means of endless rotating screen belts, rotating screen drums, or the like, it has hitherto been the practice to remove the foul substances intercepted by the screens by means of brushes, and to discharge the substances brushed off by a screw conveyor, bucket conveyor or the like. In brushing off the soft sludge-like foul substances, more especially the faecal matter, are forced by the brushes through the screens, so that these substances return to the purified water, while the separated substances as they are carried along by the screw conveyor, bucket conveyor or the like, are still further triturated and spread and give off an unpleasant smell. The fibrous foul substances are partly forced by the brushes through the screens, and partly remain on the cross bars of the screens, where they set so firmly that they can only be removed with difficulty, often forming hanging masses and presenting with the substances squeezed through the screens an exceedingly ugly appearance.

The operation of purifying water by means of rotating screen drums has therefore been superseded by removing the separated foul substances by rapidly passing a part (about 5%) of the purified water, which has passed through from the outside inwardly upon one side of the shell of the drum by the use of centrifugal force produced by the rapidly rotating drum, from the inside outwardly upon the other side of the drum shell, whereby the foul substances adhering to the outer face of the shell are scoured off and carried by the scouring water over a weir into a pit. This method, however, has great disadvantages. It involves of necessity of stopping the water to an unpermissible uniformly high level in the whole system of canals. Moreover, it is not adapted for variable quantities of foul water and for variable water levels, which are usual conditions. The foul substances are stirred up by the rapid rotation of the screen drum and are so mixed with the colloidal substances contained in the waste water that it is scarcely possible for the foul substances to be separated dry from the scouring water. Furthermore, the dilution of the foul substances with about 5% of waste water means for large plants such a considerable quantity of the foul substances in liquid form that the residues can only be rendered innocuous by decomposition in Emscher wells. This scouring method is therefore unsuitable for towns having a mixed sewerage system into which foul water, faecal matter and rain water are discharged all together.

Now, according to my invention the foul substances, which are separated from the waste water by means of a rotating endless screen belt, a rotating screen drum or any other mechanical screen, are scoured off from the screen by means of water under pressure, then separated from the scouring water by means of a further mechanical screen, and then discharged either by means of this screen, which is formed at the same time as a conveyor, or by means of a special conveyor, while the scouring water is returned to the sewer for the foul water. In this way the scouring operation does not reduce or press the foul substances and mix them with the scouring water, but it causes the substances to float away in their normal condition, as is the case with faecal matter in water closets; the substances can therefore be readily separated from the scouring water. The necessary quantity of scouring water is thus considerably less than is the case with the known scouring method hereinbefore described.

Figure 2:
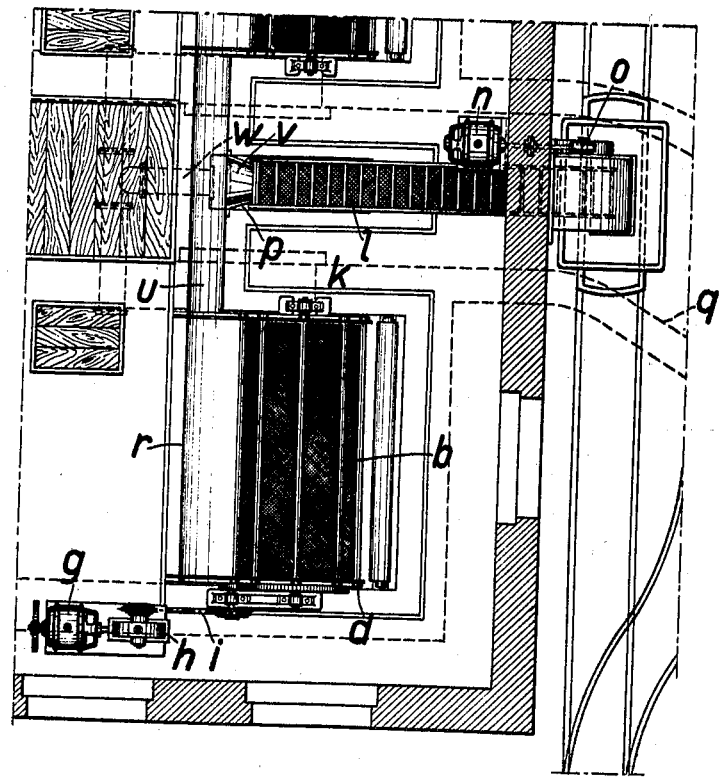

The accompanying drawings illustrate means for carrying out the new scouring method, Fig. 1 being a side elevation partly in section, and Fig. 2 being a plan view.

Within a pit $a$ sunk into the waste water sewer there is mounted an endless screen belt $b$ lying with its face transverse to the sewer and having its two upwardly or downwardly moving parts slightly inclined rearwardly or provided vertically and its lower part immersed in the water. This belt is built up in known manner of a number of screen sections, which are tightly held in suitable frames that are carried on both sides by an endless chain $c$. These two chains are guided by means of rollers $d$, which are mounted upon the ends of the pins connecting together the two chains and the links of each chain, along U-shaped rails $e$ fixed to the side walls of the pit $a$, and they run above the water over two chain wheels $f$ mounted upon a common shaft. These chain wheels are driven by an electric motor $g$ by means of a worm gear $h$ and a chain $i$, in such manner that the belt $b$ moves in the direction indicated by the arrows, and thus the front part of the belt moves upwardly and the rear part moves downwardly. One side wall of the pit $a$ is provided with an opening $k$, whose position and size correspond to those of the lower part of the belt $b$. At a certain distance from the belt $b$ there is provided a second screen belt $l$ of similar construction, but narrower and of a different shape and position, and having its two parallel parts inclined upwardly to the rear and disposed completely above the water. The carrying chains of this belt run beneath and above over pairs of chain wheels $m$, the upper pair being driven by an electric motor $n$ by means of a worm gear $o$ in such manner that the belt moves in the direction of the arrows. The lower part of this belt is in a trough $p$, which is sunk into the floor on which the parts $f$, $g$ and $h$ are supported.

The water to be purified, which flows into the pit $a$ from the forward part of the sewer (not illustrated) passes out of the space of the pit in front of the forward part of the belt $b$, and also out of the space of the pit behind the rear part of the belt from the outside through the screens immersed at the lower part of the belt into the chamber between the two parts of the belt, from which chamber it passes out laterally, after being purified by the belt, through the opening $k$ into the rear part $q$ of the sewer. The foul substances which have been separated from the water, and which have settled upon the outer face of the belt $b$ are carried upwardly by the belt, and at the upper end of the front part of the belt, before which a trough $r$ is provided, are scoured off with water under pressure which flows in fine streams forward through the belt from a pipe $s$ provided horizontally behind this part of the belt, and also downward along the belt from a second pipe $t$ provided horizontally above the first pipe and in front of the belt, and thus the foul substances are carried into the trough $r$. Thence the scouring water, carrying the foul substances, flows through a gutter $u$ connected to one end of the trough $r$ and through a discharge nozzle $v$ issuing out from this gutter rearwardly to the lower end of the front part of the belt $l$. While the scouring water may pass unimpeded through this belt and is returned from the trough $p$ through a pipe $w$ into the foul water inlet space of the pit $a$, the foul substances remaining upon the belt are carried upwardly, the scouring water still contained therein dripping off. The foul substances thus dewatered are discharged at the upper end of the belt $l$ into a wagon $x$ disposed immediately thereunder.

The belt $l$ as well as the belt $b$ is provided with transverse ledges for carrying along the loose foul substances lying upon it. These ledges of the belt $l$ may be replaced by blades or buckets. In large plants the belt $l$ may be replaced by a rotating screen drum, in combination with an ordinary elevator or any other suitable conveyor, the screen drum separating the solid foul substances from the scouring water, and also carrying these substances to the elevator which carries the dry substances away. If these substances are to be removed by decomposition they are fed into a small Emscher well. The water under pressure which is used for scouring the foul substances from the belt $b$, may be taken either from wells or from the purified waste water.

What I claim as my invention and desire to secure by Letters Patent is:

In an apparatus for the mechanical purification of town waste-water the combination of a movable screen for screening town waste-water, means for moving the screen, means for spraying off the foul substances from the said screen by means of water under pressure, means for collecting the spraying water containing the foul substances, a screen for screening the said spraying water, means for moving said screen and means operating to discharge the foul substances from the last mentioned screen as it moves and means for separately discharging the spraying water.

In testimony whereof I affix my signature.

Dr. EUGEN GEIGER.